(12) United States Patent
Wesen

(10) Patent No.: US 7,853,653 B2
(45) Date of Patent: Dec. 14, 2010

(54) METHOD OF TRACKING E-MAIL HANDLING BY A REMOTE AGENT OF AN AUTOMATIC CONTACT DISTRIBUTOR

(75) Inventor: Dave Wesen, Channahon, IL (US)

(73) Assignee: Aspect Software, Inc., Lombard, IL (US)

( * ) Notice: Subject to any disclaimer, the term of this patent is extended or adjusted under 35 U.S.C. 154(b) by 1291 days.

(21) Appl. No.: 10/981,292

(22) Filed: Nov. 3, 2004

(65) Prior Publication Data

US 2006/0093126 A1  May 4, 2006

(51) Int. Cl.
*G06F 15/16* (2006.01)
(52) U.S. Cl. .................. 709/206; 709/217; 709/224
(58) Field of Classification Search ......... 709/203–207, 709/223–224, 217–219
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,078,956 A * | 6/2000 | Bryant et al. | 709/224 |
| 6,108,711 A | 8/2000 | Beck et al. | |
| 6,128,646 A | 10/2000 | Miloslavsky | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,345,305 B1 | 2/2002 | Beck et al. | |
| 6,356,633 B1 | 3/2002 | Armstrong | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,449,634 B1 * | 9/2002 | Capiel | 709/206 |
| 6,493,695 B1 | 12/2002 | Pickering et al. | |
| 6,557,036 B1 * | 4/2003 | Kavacheri et al. | 709/224 |
| 6,581,105 B2 | 6/2003 | Miloslavsky et al. | |
| 6,732,156 B2 | 5/2004 | Miloslavsky | |
| 6,999,989 B2 * | 2/2006 | DeLaCruz | 709/204 |
| 7,035,903 B1 * | 4/2006 | Baldonado | 709/206 |
| 7,373,387 B2 * | 5/2008 | Hollatz et al. | 709/206 |
| 7,406,501 B2 * | 7/2008 | Szeto et al. | 709/206 |
| 7,441,032 B2 * | 10/2008 | Costa Requena | 709/225 |
| 2003/0187941 A1 * | 10/2003 | Suzuki | 709/206 |

(Continued)

*Primary Examiner*—Faruk Hamza
(74) *Attorney, Agent, or Firm*—Husch Blackwell LLP Welsh Katz

(57) ABSTRACT

A method and apparatus are provided for monitoring a time that an agent of an organization spends responding to an e-mail directed to the organization. The method includes the steps of downloading the e-mail and a monitoring servlet to the agent of the organization and the servlet automatically measuring and reporting to a server of the organization an elapsed time that the agent spends on the e-mail.

27 Claims, 1 Drawing Sheet

U.S. PATENT DOCUMENTS

2005/0223064 A1* 10/2005 Salerno et al. .............. 709/206
2005/0234990 A1* 10/2005 Brighouse et al. ........ 707/104.1
2006/0026288 A1* 2/2006 Acharya et al. ............. 709/227

* cited by examiner

METHOD OF TRACKING E-MAIL HANDLING BY A REMOTE AGENT OF AN AUTOMATIC CONTACT DISTRIBUTOR

FIELD OF THE INVENTION

The field of the invention relates to communication systems and more particularly to automatic call distributors.

BACKGROUND OF THE INVENTION

Automatic call distributors (ACDs) are known. Such systems are typically used by organizations to serve large numbers of callers. Typically, calls are directed to a common telephone number and distributed to agents based upon some criteria (e.g., agent idle time).

ACDs can typically process both inbound and outbound calls. Typically, a controller monitors a workload of its agents. Where a workload of received calls falls below some threshold value, the controller may begin to initiate outbound calls.

In addition to placing and distributing calls, an ACD may also identify and display documents on agent terminals as an aid to processing the calls. In the case of incoming calls, the calls may be received along with dialed number identification service (DNIS) and/or automatic number identification (ANI) information. ANI may be used to identify a caller. The controller of the ACD may use the ANI information to retrieve and display customer records on a terminal of the agent selected to handle the call at the same instant that the call is delivered to the agent.

In addition, textual information may be displayed on a terminal of the agent that guides the agent through a sales presentation. DNIS information may be used to identify an intended call target and to select an appropriate sales presentation for use by the agent based upon the intended call target.

In recent years, the functionality of ACDs has been expanded to also include processing and distributing contacts to remotely located agents through the Internet. Because of the ability to also process calls through the Internet, the older terminology of automatic call distributor has been changed to automatic contact distributor to reflect the expanded capability of such equipment.

While such equipment is useful, it is limited in its ability to track the activity of remotely located agents. Accordingly, a need exists for more flexible automatic contact distributors that are better able to track agent activity.

SUMMARY

A method and apparatus are provided for monitoring a time that an agent of an organization spends responding to an e-mail directed to the organization. The method includes the steps of downloading the e-mail and a monitoring servlet to the agent of the organization and the servlet automatically measuring and reporting to a server of the organization an elapsed time that the agent spends on the e-mail.

DETAILED DESCRIPTION OF AN ILLUSTRATED EMBODIMENT

Figure 1:
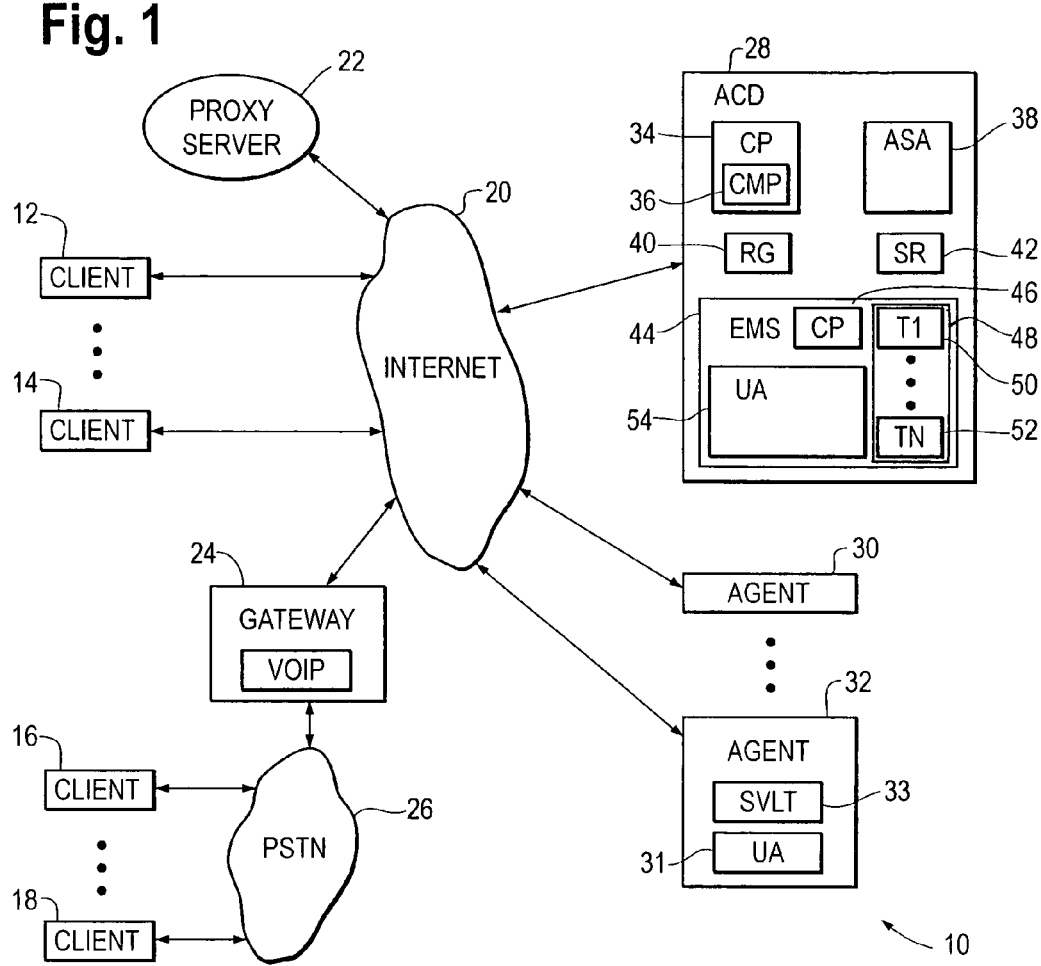
FIG. 1 is a block diagram of an automatic contact distribution system under an illustrated embodiment of the invention.

FIG. 1 depicts a contact processing system 10, shown generally in accordance with an illustrated embodiment of the invention. In general, the system 10 may be used by any of a number of different organizations (e.g., commercial, environmental, political, etc.) to advance the agenda of the organization.

Under illustrated embodiments, the system 10 may process contacts (e.g., switched circuit voice calls, voice-over-Internet-calls (VoIP), instant messaging (IM), etc.) in a conventional manner. However, the system 10 may also process e-mails directed to the organization and track the processing of those e-mails by its agents 30, 32 as described in more detail below.

Turning first to the processing of contacts, an explanation will be provided of the operation of the system 10, in general. Following the explanation of the system 10 in the context of processing contacts, a description will be provided of how e-mail activity of agents 30, 32 may be tracked by the system 10.

In order to promulgate the agenda of the organization with its clients 12, 14, 16, 18, the organization may publish, by advertising or otherwise, one or more telephone numbers, universal resource locators (URLs), instant messaging (IM) addresses or e-mail addresses that identify communication paths to the organization. Clients 12, 14, 16, 18 may use these communication path identifiers to initiate contacts with the organization. Alternatively, the organization may purchase communication path identifiers of potential clients and place outgoing contacts directed towards the clients 12, 14, 16, 18.

In this regard, contacts with clients 16, 18 through the PSTN 26 may pass through a gateway 24 where voice information may be converted from the switched circuit format of the PSTN 26 to an Internet format using a voice-over-Internet-protocol (VOIP) application. Address resolution and call routing may be accomplished under Session Initiation Protocol (SIP) as described by the Internet Engineering Task Force (IETF) RFC #3261. Once converted into an Internet format, contacts with clients 12, 14 (and clients 16, 18) may be processed and distributed to its agents 30, 32 by the automatic contact distributor 28.

In all cases, contacts set up through the Internet 20 may be delivered by the automatic contact distributor 28 to an agent 30, 32 working through a terminal. In general, as each contact is detected (i.e., with a client 12, 14, 16, 18), a contact processor 34 may open a contact record and assign a unique identifier to the contact that may also be used as the record identifier. Within the record the contact processor 34 may include any contact associated information that allows a comparison processor 36 within the contact processor 34 classify the contact into one or more project types. In the case of calls through the PSTN 24, DNIS and ANI information may be able to identify the intended call destination and caller.

Where the organization uses different telephone numbers for different subject matter (e.g., the organization is a department store and the telephone numbers identify different departments), the DNIS information may be use (e.g., by itself) to determine a type of call involved. In addition, ANI may be used to identify the caller and to identify client records. The client records may be used to further clarify a subject matter and type of call.

Similarly, contacts with clients 12, 14 through the Internet may be classified to determine a type of call based upon other categories of contact associated information (e.g., a source universal resource locator or indicator (URL or URI), e-mail address, IM address, etc.). If the organization should provide a website, then any webpages visited by a client 12, 14 in advance of the contact may be used to identify a subject matter and type of contact. As with contacts through the PSTN 26, the call processor 34 may open a file for contacts through the Internet, including any contact associated information.

Once a contact type is determined for a contact, the contact may be transferred to an agent selection application 38. The agent selection application 38 may function to identify an agent 30, 32 to handle the contact. Agent selection may be based upon any agent criteria (e.g., longest available, best skilled for the call type, etc.). Under one illustrated embodiment, the determined call type may be compared with a set of skills for each agent 30, 32 to identify an agent best qualified to handle the contact.

Once an agent is identified, the contact may be transferred to the selected agent 30, 32. The agent selection application 38 may transfer an Internet path identifier to the terminal of the agent 30, 32 along with instructions to the terminal to activate the appropriate communication channel (e.g., VOIP, IM, etc.) that, in turn, forms the communication channel.

In addition to transferring the contact to the selected agent 30, 32, the agent selection application 38 may also transfer an identifier of the selected agent and contact record to a display processor. The display processor may use the identifier of the client from the contact record to retrieve any client records from an associated database and display the client records on the terminal of the agent 30, 32 at the same instant that the contact is delivered.

Turning now to e-mails, an explanation will now be provided of how e-mails may be classified, distributed and tracked. In this regard, e-mails delivered to the system 10 may be initially received and saved in an e-mail server 44. To simplify classification, the organization may provide a number of e-mail addresses within a domain name of the automatic contact distributor 28 as a means for classifying the contact within one or more predefined contact types. Other methods of classification may include word recognition of the e-mail text and comparison of recognized words with a set of classification templates. As the e-mails are received by the e-mail server 44, a classification processor 46 may classify each e-mail and save the e-mail within a respective file 50, 52 in memory 48 based upon time of arrival and type.

Once the e-mail has been classified, the agent selection application 38 may select an agent to handle the e-mail. Agent selection may be based upon any criteria (e.g., longest available, skill, etc.). Where based upon skill, the contact type and any other classification information may be compared with a set of agent skills and an agent selected accordingly.

Once an agent 30, 32 has been selected, the agent selection application 38 may download the e-mail and a servlet 33 for tracking the handling of the e-mail to the selected agent 30, 32. Once the e-mail and servlet 33 have been downloaded to the agent 30, 32, the agent 30, 32 may open and respond to the e-mail while at the same time, the servlet 33 tracks and reports on the agent's activities.

The downloading of the e-mail and servlet 33 to the selected agent 30, 32 may be accomplished under any of a number of different processes. Under a first process, a SIP user agent 54 within the e-mail server 44 may first transfer a SIP INVITE (as defined by IETF RFC #3261) to the selected agent 30, 32, notifying the selected agent 30, 32 of the assigned e-mail. A corresponding user agent 31 within the selected agent 30, 32 may return a SIP ACK and the user agent 54 may download the e-mail and servlet encoded within a midcall signaling message, such as a SIP INFO message. The user agent 31 may then send a SIP BYE message or leave the connection in place for delivery of subsequent e-mails.

Under another process, the agents 30, 32 may each send a SIP SUBSCRIBE message to the e-mail server 44, subscribing to the presence of e-mails assigned to the respective agents 30, 32. When an e-mail is assigned to an agent 30, 32, the user agent 31 may send a SIP NOTIFY message to the respective agent 30, 32, notifying the agent of the presence of an e-mail assigned to the agent 30, 32 and including the unique contact number assigned to the contact by the system 10.

In response to the SIP NOTIFY, the agent 30, 32 may send a SIP INVITE to the e-mail server 44 where the "To" field contains a subscript with the unique identifier of the contact. The server 44 may return a SIP ACK message followed by the server 44 downloading the e-mail and servlet (e.g., encoded within an midcall signaling message).

Under still another process, the e-mail and servlet 33 may be encoded into an instant message (IM) and downloaded using features again described within IETF RFC #3261. In this regard, agents 30, 32 may sign-on to the system 10 for receiving contacts at a beginning of a shift with a SIP registrar server 42 using a SIP REGISTER message as defined by IETF RFC #3261. Registration of remotely located agents 30, 32 with the registrar 42 allows the agent selection application 38 to periodically search the registrar 42 for purposes of identifying signed-on agents 30, 32.

Figure 2:
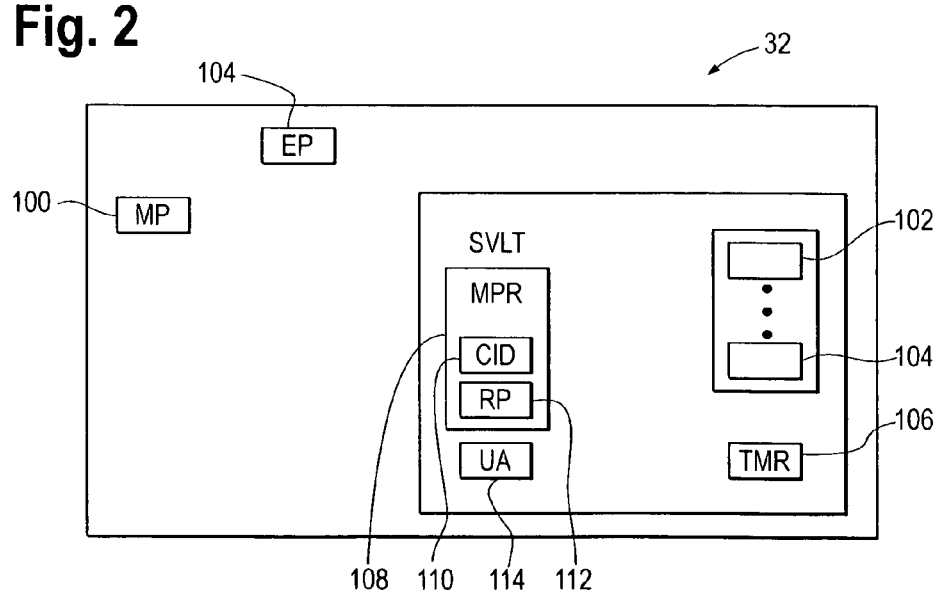
FIG. 2 is a block diagram of a servlet that may be used by the system of FIG. 1.

Once the downloaded e-mail and servlet are received by an agent 30, 32, the servlet 33 may be structured to immediately activate and perform a number of functions. One function may be to place the associated e-mail into a directory of an e-mail processor (e.g., OUTLOOK by Microsoft) 100 (FIG. 2) on the agent's terminal and to automatically activate the e-mail processor 100 to display the e-mail.

A second function performed by the servlet 33 may be to monitor and report on agent activity regarding the associated e-mail. In this regard, the servlet 33 may be provided with an internal timer 106 that measures the time that the associated e-mail is open and to report on any responses or follow-up e-mails.

In this regard, the servlet 33 may contain internal registers 102, 104 that contain the Internet addresses of the selected agent 30, 32 and the original source of the e-mail (i.e., a client 12, 14). A third register 110 may contain the unique contact identifier assigned by the contact distributor 28.

A monitoring processor 108 within the servlet 33 may compare the "from" and "to" fields of any active e-mails with the contents of the registers 102, 104. If the "from" field of any new e-mail indicates that it is from the same client 12, 14 as the original e-mail delivered from the agent selection application 38, then the monitoring processor 108 may report the arrival of the new e-mail and begin timing how much time the agent 30, 32 spends on the new e-mail.

Similarly, the monitoring processor 108 may monitor the "to" field of any e-mails being composed. If the "to" field is determined to contain the Internet address of the original client 12, 14, then the monitoring processor 108 again begins timing the duration of preparation of the e-mail.

Periodically, the monitoring processor 108 may send a report on e-mail activity to the automatic contact distributor 28. In this regard, the monitoring processor 108 may transfer any collected data regarding the original e-mail and any follow-up e-mails to a reporting processor 112 along with the contact ID 110. The reporting processor 112 may receive the e-mail data and upon occasion compose and transfer a SIP REGISTER message to the registrar 42 of the automatic contact distributor 28. The SIP REGISTER message may have the form as follows:

REGISTER sip: registrar@autocondist.com SIP/2.0
    From: Agent30@autocondist.com
    Contact: t=a
    Contact: m=b:c
    Contact: r=d:e
    Contact-Length=0

In this example, the expression "t=a" may indicate that the e-mail has been open for a time "t" that equals "a" minutes. The expression "m=b:c" may indicate that a response to the e-mail was sent at a time where "b" is the hour of the day and "c" is an indication of the minutes after the hour "b". The expression "r=d:e" may indicate that another e-mail was received from the original sender at a time where "d" is the hour of the day and "e" is an indication of the minutes after the hour "d".

Periodically, a reports generator 40 may retrieve the SIP REGISTER messages of each agent 30, 32 from the SIP registrar 42. By totaling a time between when the original e-mail was opened and closed, the report generator 40 may determine a time that the agent 30, 32 spent preparing a response and when the response was sent. By adding in the time involved in other e-mails from the same client 12, 14, the reports generator 40 may be able to determine a total overall time that the agent 30, 32 has committed to a response to the e-mail and any follow-on e-mails.

A specific embodiment of method and apparatus for monitoring a time that an agent of an organization spends responding to an e-mail has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of processing an e-mail directed to an organization by a client and handled by a remotely located agent of the organization, such method comprising:
   the agent sending a SIP SUBSCRIBE message subscribing to presence of e-mails assigned to agents;
   receiving the e-mail at a contact processing center of the organization;
   sending a SIP message to the agent notifying the agent of the e-mail, the agent returning a SIP message to activate downloading the e-mail to the agent;
   downloading the received e-mail along with a monitoring servlet encoded within a midcall message together in a single message from the contact processing center to a terminal of the remotely located agent of the organization; the agent sending a response to the e-mail to the client; and
   the servlet automatically activating display of the e-mail on the terminal of the agent and measuring and reporting to a server of the contact processing center of the organization activity of the agent on the e-mail.

2. The method of processing an e-mail as in claim 1 further comprising the servlet detecting the agent opening the e-mail and activating a timer in response, and the servlet deactivating the timer when the agent closes the e-mail.

3. The method of processing an e-mail as in claim 1 further comprising transferring a SIP INVITE to the agent notifying the agent of the e-mail, the agent terminal returning a SIP ACK and downloading the e-mail and the servlet encoded within a midcall signaling message.

4. The method of processing an e-mail as in claim 1 further comprising the agent sending the SIP SUBSCRIBE message subscribing to presence of e-mails assigned to the agent, sending a SIP NOTIFY message to the agent notifying the agent of an e-mail assigned to the agent and the agent sending a SIP INVITE to activate downloading the e-mail and servlet encoded in a midcall signaling message.

5. The method of processing an e-mail as in claim 1 further comprising the servlet detecting the agent sending a response to an original source of the e-mail and reporting the sent response to the server.

6. The method of processing an e-mail as in claim 5 further comprising encoding the servlet and e-mail into an instant message and downloading the instant message to the agent terminal.

7. The method of processing an e-mail as in claim 5 further comprising the servlet containing an address of the agent and an address of the original source, the servlet comparing from and to fields of active e-mails with the addresses to determine if a new e-mail is from the original source.

8. The method of processing an e-mail as in claim 6 further comprising the servlet detecting receipt of another e-mail from the original source and reporting the detection to the server.

9. The method of processing an e-mail as in claim 8 further comprising the servlet transferring a SIP REGISTER message from the agent terminal to the contact processing center regarding e-mail activity of the agent.

10. The method of processing an e-mail as in claim 8 further comprising the servlet measuring a time that the other e-mail is open and reporting to the server an elapsed time the other e-mail was open.

11. An apparatus for processing an e-mail directed to an organization by a client and handled by a remotely located agent of the organization, such apparatus comprising:
   means for sending a SIP SUBSCRIBE message from the agent to subscribe to presence of e-mail assigned to agents;
   means for receiving the e-mail at a contact processing center of the organization;
   means for sending a SIP message to the agent notifying the agent of the e-mail, the agent returning a SIP message to activate downloading the e-mail to the agent;
   means for downloading the e-mail together with a monitoring servlet encoded within a midcall message from the contact processing center via an internet connection to a terminal of the agent of the organization in a single message; and
   means, including the servlet, for automatically measuring agent and e-mail activity and reporting using a SIP messaging to a server of the contact processing center of the organization an elapsed time that the agent spends on the e-mail.

12. The apparatus for processing an e-mail as in claim 11 further comprising means including the servlet for detecting the agent opening the e-mail and activating a timer in response, and for deactivating the timer when the agent closes the e-mail.

13. The apparatus for processing an e-mail as in claim 11 further comprising means for transferring a SIP INVITE to the agent notifying the agent of the e-mail, the agent returning a SIP ACK and downloading the e-mail and the servlet encoded within a signaling message.

14. The apparatus for processing an e-mail as in claim 11 further comprising means for enabling the agent to send the SIP SUBSCRIBE message subscribing to presence of e-mails assigned to the agent, means for sending a SIP NOTIFY message to the agent notifying the agent of an e-mail assigned to the agent and means for enabling the agent to send a SIP INVITE to activate downloading of the e-mail and servlet encoded in a midcall signaling message.

15. The apparatus for processing an e-mail as in claim 11 further comprising means including the servlet for detecting the agent sending a response to an original source of the e-mail and reporting the detection to the server.

16. The apparatus for processing an e-mail as in claim 15 further comprising means for encoding the servlet and the e-mail into an instant message and downloading the instant message to the agent terminal.

17. The apparatus for processing an e-mail as in claim 16 further comprising means including the servlet for detecting receipt of another e-mail from the original source and reporting the detection to the server.

18. The apparatus for processing an e-mail as in claim 17 further comprising means for transferring a SIP REGISTER message from the agent terminal to the server of the contact processing center of the organization regarding e-mail activity of the agent.

19. The apparatus for processing an e-mail as in claim 17 further comprising means including the servlet for measuring a time that the other e-mail is open.

20. The apparatus for processing an e-mail as in claim 17 further comprising means including the servlet for reporting to the server an elapsed time the other e-mail was open.

21. An apparatus for processing by an agent of an organization an e-mail directed to an organization through an internet, such apparatus comprising:
   a terminal associated with the agent which sends a SIP SUBSCRIBE message from the agent to subscribe to presence of e-mails assigned to agents,
   a server of a contact processing center of the organization which receives the e-mail the server sending a SIP message to the terminal notifying the agent of the e-mail, the terminal returning a SIP message to active downloading the e-mail to the agent;
   a servlet encoded within a midcall message that is downloaded along with the e-mail in a single message from the contact processing center through the internet to the terminal associated with the agent of the organization using SIP messaging, the servlet structured to automatically activate the terminal to display the e-mail; and
   a processor utilizing the servlet for automatically monitoring e-mail activity of the agent and reporting using SIP messaging to the server of the organization activity of the agent on the e-mail.

22. The apparatus for processing an e-mail as in claim 21 further comprising a timer within the servlet that is activated when the agent opens the e-mail and deactivated when the agent closes the e-mail.

23. The apparatus for processing an e-mail as in claim 21 further comprising an e-mail server that transfers a SIP INVITE to the agent notifying the agent of the e-mail, the agent terminal returning a SIP ACK, and downloading the e-mail and the servlet to the agent terminal encoded within a SIP signaling message.

24. The apparatus for processing an e-mail as in claim 21 wherein the server further comprises a registrar server for receiving registration messages from the servlet.

25. The apparatus for processing an e-mail as in claim 24 wherein the registration messages further comprising a SIP REGISTER message.

26. The apparatus for processing an e-mail as in claim 25 further comprising a reports generator that retrieves SIP REGISTER messages from the servlet of the agent and that generates statistical reports on e-mail handling by the agent.

27. The apparatus for processing an e-mail as in claim 21 further comprising an automatic contact distributor that downloads the servlet and e-mail to the agent.

\* \* \* \* \*